United States Patent Office

2,900,352
Patented Aug. 18, 1959

2,900,352

ANION EXCHANGE RESINS AND METHOD OF PREPARATION THEREOF

James A. Patterson, Menlo Park, and Irving M. Abrams, San Carlos, Calif., assignors to Chemical Process Company, San Francisco, Calif., a corporation of Nevada No Drawing. Application December 28, 1955
Serial No. 555,791

18 Claims. (Cl. 260—2.1)

This invention relates to anion exchange resins, and more particularly to anion exchange resins prepared by introducing nitrogen-containing functional anion exchange groups into an aromatic polymer that has been reacted with a complex of a formaldehyde source, a polar solvent, and a halosulphonic acid.

Ion exchange resins are commonly prepared by attaching functional ion exchange groups to cross-linked resin matrices. The term "resin matrix" or "resin matrices" as employed herein designates the hard, infusible carrier resin or resins that are insoluble in polar and nonpolar solvents, and to which functional ion exchange groups are attached. Linear polymers composed of chains of polymerized monomer without cross-linking between separate adjacent polymeric chains are unsatisfactory for use as ion exchange resin matrices, since such polymers are fusible and they dissolve in various organic solvents. Furthermore, linear polymers tend to become water soluble when highly polar, functional ion exchange groups are introduced into the linear resin matrices.

The most widely used ion exchange resin matrices are prepared by copolymerizing a major proportion of a liquid monovinyl aromatic compound with a minor proportion of a polyvinyl cross-linking compound, such as divinylbenzene, to form a cross-linked resin matrix that is infusible and insoluble in organic and inorganic liquids. Weakly basic anion exchange resins can be prepared by nitrating such cross-linked aromatic resin matrices with nitric acid followed by reduction in accordance with the method disclosed in United States Letters Patent No. 2,366,008. Also, strongly basic quaternary ammonium anion exchange resins may be prepared by aminating haloalkyl groups attached to such cross-linked polyvinyl aromatic resin matrices in accordance with the disclosures in United States Patent Nos. 2,591,573 and 2,614,099.

Although ion exchange resin matrices prepared in the usual manner by copolymerizing a monovinyl aromatic compound with a polyvinyl cross-linking agent provide excellent insoluble and infusible resin matrices for ion exchange resins, the methods of attaching functional anion exchange groups to such resin matrices involve reactions that are hazardous and corrosive. In addition, aromatic monovinyl compounds are usually cross-linked by copolymerization with divinylbenzene, which is sold commercially in a mixture containing ethylvinylbenzene, styrene and unpolymerizable materials. Divinylbenzene is relatively expensive, and the degree of cross-linking obtained with the variable commercial divinylbenzene mixtures is not reproducible.

Furthermore, the standard methods of preparing anion exchange resins do not lend themselves to the formation of homogeneous anion exchange membranes because of problems such as the formation of cracks in the membrane during the reaction by which functional ion exchange groups are attached to the resin matrix. The most practical procedure commonly employed to form ion exchange membranes has been to bind finely divided cross-linked resin particles by means of a thermoplastic linear resin. However, this procedure produces a heterogeneous membrane structure in which the low conductivity of the thermoplastic binder requires increased current consumption during operation of the membrane. Also, the thermoplastic binder tends to melt if overheated.

Summarizing this invention, the foregoing problems are overcome and anion exchange resins having advantageous characteristics are prepared by subjecting an aromatic vinyl polymer to contact with a mixture of a formaldehyde source, an oxygen-containing polar liquid, and halosulphonic acid. The mixture of formaldehyde source, polar liquid, and acid forms a complex, herein called halosulfonic acid-formaldehyde complex, that cross-links polymeric chains of said polymer to form a resin matrix that is infusible and insoluble in organic and inorganic liquids, and also introduces active side chains into said polymer which readily undergo further reaction. Functional anion exchange groups are then attached to the active side chains by subjecting the polymer to reaction with an amine, to form an anion exchange resin.

Preparation of an anion exchange resin by the method of this invention enables a cross-linked insoluble and infusible resin matrix to be prepared without the necessity of employing divinylbenzene, and a consistent degree of cross-linking and side chain formation is readily obtained. Also, active side chains are introduced into the resin matrix at the same time that the resin is being cross-linked, and the side chains need not be introduced by a separate reaction. Furthermore, an anion exchange membrane may readily be prepared by forming a thin film of a linear aromatic vinyl polymer that has been subjected to the halosulfonic acid-formaldehyde complex hereof to provide a homogeneous cross-linked matrix for an ion exchange membrane. The matrix prepared in this manner is relatively resistant to cracking upon undergoing subsequent reaction with an amine for introduction of functional anion exchange groups. Although a mixture of various acids with a formaldehyde source provides cross-linking of a vinyl aromatic polymer, as more completely described in applicants' copending application for "Cross-Linked Resinous Polymers and Methods of Preparation Thereof," Serial No. 555,797, filed December 28, 1955, only the complex of halosulfonic acid, a formaldehyde source, and a polar liquid, produces both cross-linking and introduction of active side chains to which functional anion exchange groups are readily attached.

In greater detail, polyvinyl aromatic polymers that may be converted by the method of this invention into cross-linked ion exchange resin matrices that have active side chains are well known. Such linear polymers are commercially available and they are prepared in the customary manner by polymerizing a monovinyl aromatic compound alone or with another monovinyl compound to provide a linear polymer that is fusible and soluble in various non-aqueous solvents. Substituted or unsubstituted monovinyl aromatic compounds are employed for forming the linear polymer. Examples of suitable monovinyl aromatic compounds are styrene, vinyl toluene, alpha-methyl styrene, vinyl xylene, vinyl naphthalene, ethylvinylbenzene, monochlorostyrene and vinyl anthracene, each of which has a vinyl group attached directly to the aromatic nucleus whereby aromatic nuclei are attached directly to the polymerized vinyl chain in the polymer of such aromatic vinyl compounds.

Suitable linear aromatic polymers that can be cross-linked to form ion exchange resin matrices having active side chains can also be formed by copolymerizing an aromatic monovinyl compound with a monovinyl compound that does not contain an aromatic nucleus, such as vinyl chloride or acrylonitrile. It is only necessary that one component of the copolymer contain aromatic nuclei so that there will be nuclei available for cross-linking and for attachment of active side chains. Also, polymers already cross-linked, such as those formed with a major amount of styrene copolymerized in a conventional manner with a minor amount of divinylbenzene, as disclosed in the previously mentioned patents, may be further cross-linked together with introduction of active side chains by subjecting such polymers to the halosulfonic acid-formaldehyde complex.

Monovinyl aromatic monomers are readily polymerized to form solid linear polymers in the usual manner by heating the liquid monomer in the presence of a catalyst. Suitable catalysts include the organic peroxides, such as benzoyl peroxide, lauroyl peroxide, and methylethylketone peroxide. Azo compounds, such as azobis-isobutyronitrile are also useful as catalysts. Even heat alone causes polymerization of the vinyl monomer, although the rate of polymerization is very slow in the absence of a catalyst. Consequently, the polymerization is generally conducted with a catalyst at temperatures from 80° C. to 120° C. Between approximately 0.1% and 2.0% by weight of catalyst, based upon the weight of monovinyl compounds, is generally employed. Polymerization is most advantageously continued until the liquid monomer is transformed into a solid, linear, fusible polymer that can be shaped by heat and pressure. The bead form of the linear polymer is readily prepared by the well known technique of suspension polymerization described in Chapter I, pages 1 to 20 of "High Molecular Weight Organic Compounds", by Hohenstein and Mark, and this method may be employed in the preparation of anion exchange beads by the method hereof.

Cross-linking and introduction of side chains into an aromatic polymer in order to provide an insoluble and infusible resin matrix that has active side chains is effected by a mixture of a formaldehyde source, an oxygen-containing polar liquid, and a halosulfonic acid such as chlorosulfonic acid. Halosulfonic acid may be defined as a mixture of a sulfuric acid with a hydrogen halide. Non-halogen-containing acids do not provide the desired formation of active side chains on the polymer, even though the acids specified in applicants' previously mentioned copending application do effect cross-linking of the polymeric chains when the acids form a complex with a formaldehyde source.

Formaldehyde, or a compound that is a source of formaldehyde, both herein referred to under the term "reacted with formaldehyde" or "reacting with formaldehyde" or "formaldehyde reactant," is mixed with the polar liquid and the specified acid to form the complex hereof. The formaldehyde source should desirably not contain any appreciable quantity of water, since water has the effect of diluting the acid and reducing the cross-linking property of the halogen-containing, acid-formaldehyde complex. However, commercial aqueous formaldehyde solutions, such as formalin, produce a degree of cross-linking, and provide substantial formation of active side chains. Any reversible polymer of formaldehyde that acts chemically as a solid source of formaldehyde, such as the polyoxymethylenes, is employed for best results. Paraformaldehyde, trioxane and tetraoxymethylene are examples of suitable solid formaldehyde sources.

When a polar oxygen-containing liquid that is a non-solvent for the linear polymer is mixed with a formaldehyde source and a halosulfonic acid, the complex introduces side chains into a vinyl aromatic polymer subjected to the complex, in addition to cross-linking the polymeric chains of the polymer. Unless the polar liquid is present in the complex, only cross-linking is obtained without formation of active side chains. The active side chains render the polymer much more hydrophilic than the aromatic polymer that is cross-linked without formation of side chains. Polar liquids that cause formation of side chains with vinyl aromatic polymers when mixed in the halosulfonic acid-formaldehyde complex above specified are oxygen containing liquids that are non-solvents for the polymers, and which are substantially miscible with water. Such polar compounds are hereinafter included under the term "low molecular weight electronegative oxygen-containing aliphatic liquid non-solvent for the linear aryl polymer." Compounds that are not strongly polar, such as chlorinated aliphatic liquids, tend to dissolve the polymer before cross-linking can be achieved, and thus are unsuitable for use in the complex.

Examples of suitable polar liquids are the low molecular weight primary alcohols, ketones, aldehydes, liquid organic acids and nitroparaffins. Primary alcohols up to and including butanol are excellent for providing side chains in an aromatic polymer when the alcohols are mixed in the complex. Methanol is the polar liquid that produces best results, since it causes the introduction of a greater number of side chains into the polymer than the other polar liquids. Alcohols that have a molecular weight higher than butanol are generally not suitable since they tend to dissolve linear aromatic polymers. Low molecular weight liquid ketones, aldehydes and organic acids that do not dissolve the linear aromatic polymer, such as acetone, acetaldehyde, and dichloroacetic acid, are also suitable. Although nitroparaffins may be employed as the polar liquid, they provide less than half as many side chains as methanol. Even water, which is a polar liquid, provides a small degree of side chain formation in the aromatic nuclei of the polymer, as long as the amount of water is not so large that it dilutes the acid sufficiently to render the complex ineffective. Water affects the degree of cross-linking adversely in proportion to the amount of water present. Whereas, relatively small amounts of water appreciably decrease the extent of cross-linking, side chain formation occurs in the presence of substantial quantities of water. In general, basic polar liquids should be avoided since they tend to neutralize the acid in the complex.

In order to obtain maximum possible cross-linking between the polymeric chains, at least two moles of strong acid and two moles of formaldehyde monomer or equivalent should be present for each aromatic nucleus in the polymer. However, even very small quantities of acid and formaldehyde provide sufficient cross-linking to render the polymer substantially insoluble and infusible. The amount of cross-linking is increased with increasing amounts of complex until a maximum is reached at almost two moles of acid and formaldehyde for each aromatic nucleus, after which a further increase in the amount of acid and formaldehyde has no further cross-linking effect. For practical purposes, in order to have sufficient complex to cover the polymer, a complex containing at least about four moles of acid and four moles of formaldehyde is employed.

The proportional amount of acid to formaldehyde in the complex is not critical as long as each component is present in an amount sufficient to produce the desired extent of cross-linking. An excess of either acid over formaldehyde, or formaldehyde compared to the quantity of acid does not increase the extent of cross-linking, since only equi-molar amounts of the components are active in producing cross-linking. The excess of either component is usually not harmful, but it is merely wasted. However, a substantial excess of sulfur-containing acid usually should be avoided or else the aromatic nuclei of the polymer may be sulfonated. Sulfonation of the polymer before appreciable cross-linking has occurred tends to produce partial solution of a linear polymer. When the formaldehyde source is a base, such as hexamethylene tetramine, use of an excess of acid is employed to neutralize the base.

It is standard practice to determine the extent of cross-linking of styrene-divinylbenzene copolymers by measuring the swelling of the polymer when it is immersed in a non-polar organic solvent, such as benzene. The amount of swelling is inversely related to the percent of divinylbenzene or in other words to the degree of cross-linking, and the relationship can be graphically plotted. Treatment of a linear styrene polymer with a complex containing two or more moles of chlorosulfonic acid mixed with two or more moles of formaldehyde in the form of paraformaldehyde for each aromatic nucleus in the polymer, without formation of active side chains by including a polar liquid, has produced an amount of cross-linking equivalent to that obtained by reacting the styrene with from 6–8 percent by weight divinylbenzene. When a polymer having active side chains is formed by use of a halosulfonic acid-formaldehyde complex hereof that includes an oxygen-containing polar liquid, the degree of cross-linking is about the same as without the polar liquid. However, it has been found that upon heating such a polymer that has active side chains, hydrochloric acid and formaldehyde are given off and the extent of cross-linking is increased to about the equivalent of fifty percent by weight divinylbenzene copolymerized with about fifty percent by weight of the monovinyl compound, although the reactivity of the side chains is destroyed by the heating. Since copolymerization of styrene with as little as 0.01 percent by weight divinylbenzene provides a polymer that swells but which is substantially insoluble in non-polar solvents, the extent and effectiveness of cross-linking a linear aromatic polymer by the method of this invention is readily apparent.

Any amount of the polar liquid hereof in a complex of the halosulfonic acid and formaldehyde source causes some active side chain formation when an aromatic polymer is treated with such a complex. Maximum active side chain formation is assured by use of about two moles of polar liquid for each aromatic nucleus. The proportional amount of polar liquid present in the complex is not critical. Only approximately equi-molar quantities of the specified halosulfonic acid, formaldehyde, and polar solvent are effective in forming active side chains. Consequently, such equi-molar amounts are preferably employed, since an excess of one component over any other does not increase or decrease active side chain formation.

In preparing a complex that includes a polar solvent for introducing active side chains into the polymer as well as for effecting cross-linking of the polymeric chains, the components of the complex may be mixed in any order. The formaldehyde source is preferably dissolved in the polar liquid, such as methanol, and the halosulfonic acid added gradually with stirring and cooling. It has been found that the complex which includes the polar solvent slowly ages after it has been prepared, and gradually loses its property of introducing active side chains into the polymer, even though the complex retains its ability to cross-link the polymer. Storage of the complex in a refrigerator enables it to retain active side-chain forming properties for many months.

Introduction of active side-chains and cross-linking a vinyl aromatic polymer is effected by immersing the polymer in the complex, preferably with agitation. The complex hereof effects reactions on the immediate surface of a solid polymer within a few minutes, but complete penetration throughout the polymer may take several hours or more. The period for maximum extent and penetration of the reactions varies depending upon the type and dimensions of the polymer being treated, the particular acid, source of formaldehyde, and polar liquid employed, and the conditions of cross-linking. The temperature of the complex is advantageously maintained below 50° C., and for best results below 32° C. in order to prevent sulfonation of the aromatic nucleus. Sulfonation is not desirable in making an anion exchange resin. The treated polymer is washed thoroughly with water in order to remove the acid, and then the polymer may be dried by any conventional means. Drying at temperatures below 50° C. is preferred in order not to destroy the activity of the side chains.

When methanol is the polar solvent that is included in a mixture of chlorosulfonic acid and a formaldehyde source in order to introduce active side chains into an aromatic vinyl polymer, a highly complex mixture is formed which generally separates into two phases. With the complex of chlorosulfonic acid, paraformaldehyde and methanol, the lower phase has a specific gravity of about 1.7, and the upper phase has a specific gravity of about 1.35. The upper phase constitutes on the average about one part by volume to seven parts by volume of the lower phase, although the ratio varies considerably.

The upper phase of the two phase system of chlorosulfonic acid, formaldehyde source and methanol tends to swell and dissolve the linear aromatic polymer, but it gives no measurable cross-linking or active side chain formation. The lower phase alone is effective in cross-linking aromatic polymeric chains, but provides very little active side chain formation. However, the combination of the upper and lower phases mixed together with constant vigorous agitation effects cross-linking of an aromatic polymer with a high yield of active side chains. The upper phase swells the polyvinyl aromatic resin, and allows ready penetration into the polymer by the cross-linking and active side chain producing components of the lower phase.

Use of a complex of chlorosulfonic acid, formaldehyde source, and methanol to treat aromatic polymers results in comparatively rapid disappearance of the upper phase of the complex. The lower phase can be reused by adding the ingredients of the complex, including methanol, to the spent material to replace the moles of complex that actually enter into the reaction. When this is done, most or all of the added complex enters the lower phase and usually does not form an upper phase. Without the presence of the upper solvent phase to swell the beads, the extent of active side chain formation is limited. It has been surprisingly found that inert substantially non-polar solvents which swell or tend to dissolve the aromatic vinyl polymer and which do not react with the lower phase, can be added as a replacement for the upper phase. Chlorinated aliphatic liquids such as carbon tetrachloride, methylene chloride, ethylene dichloride, tetrachloroethane and percholoroethylene are examples of suitable substitutes for the upper phase when the polymer being treated is an aromatic vinyl resin. Other suitable replacement solvents include petroleum ether, higher molecular weight nitroparaffins, carbon disulfide, and diethyl ether.

The ratio of the added solvent upper phase to the used lower phase of the complex affects the amount of swelling of the aromatic vinyl polymer and also the degree of active side chain formation. As the ratio of upper to lower phase is increased by addition of the solvent, the amount of swelling of the polymer and also the extent of active side chain formation is increased. Small amounts of upper phase solvent provides a correspondingly small amount of swelling and side chain formation. A ratio of about 1 part by volume of added solvent upper phase to from 2 to 50 parts by volume lower phase may generally be employed for obtaining a compromise between side chain formation and swelling of the polymer. Best results are obtained by adding sufficient inert replacement solvent to provide a ratio of about one part by volume of solvent to about seven parts by volume lower phase.

The following table illustrates the effect of different ratios of added upper to lower phase of the complex on the volume exchange capacity of a quaternary ammonium anion exchange resin prepared by the method of this invention, and also the effect on the yield of quaternary ammonium functional exchange groups. The yield is expressed in terms of percent formation of functional exchange groups per aromatic nucleus in the polymer. A yield of 100% would indicate the attachment of one quaternary ammonium anion exchange resin per aromatic nucleus in the polymer. The volume anion exchange capacity decreases as the proportional amount of added upper phase is increased, because of the corresponding increase in volume of the swelled anion exchange resin.

| Ration in parts by volume | | Volume anion exchange capacity Meq. per ml. | Yield, percent |
|---|---|---|---|
| Added upper phase | Lower phase | | |
| 1 | 10 | 1.0 | 60 |
| 1 | 7 | 0.9 | 73 |
| 1 | 4 | 0.6 | 82 |

The freshly prepared complex of acid, formaldehyde source, and polar liquid tends to dissolve the linear polyvinyl aromatic resin, or at least to cause fusion of linear aromatic particles that contact each other when the polymer is placed in the complex. This difficulty is considerably aggravated if adequate stirring is not maintained since the light polymer tends to rise to the top solvent phase of the complex. Consequently, the mixture is preferably stirred sufficiently to maintain complete interspersion of one phase in the other. It has been found that this problem of partial solution of the polymer can be eliminated by wetting the polymer with sulfuric acid prior to immersion in the complex. The acid slows up the penetration of the upper solvent phase into the polymer and permits the cross-linking component to render the linear polymer insoluble in the upper phase before any of the polymer is dissolved. As an alternate procedure, the upper phase of the complex can be removed, and the linear aromatic polymer can be immersed in the lower phase for a few minutes to partially insolubilize the polymer by cross-linking. The upper phase is then added with stirring to the suspension of polymer in the lower phase in order to swell the polymer to permit introduction of a substantial number of active side chains into the polymer.

The cross-linking constituents and the active side chains that are formed include an oxygen atom. A halosulfonic acid-formaldehyde complex, without inclusion of a polar solvent produces a weight gain of between about 15 and 30 percent in the linear polyvinyl polymer that is cross-linked without formation of active side chains. These resins that do not have active side chains contain oxygen but do not contain appreciable quantities of halogen. However, when a polar liquid is included in a chlorosulfonic acid-formaldehyde mixture to provide active side chains as well as cross-linking, the weight gains in the linear polymer are between about 70 and 220 percent depending upon the extent of the reaction. Analyses of such polymers indicate the presence of a large amount of chlorine and oxygen in approximately equi-molar amounts, with a typical empirical formula of $C_{16}H_{17}ClO$. When such polymers containing active side chains are dried and heated, hydrochloric acid and formaldehyde are given off and the resultant polymer weighs the same as the cross-linked polymer without active side chains.

After the cross-linked aromatic polymer containing active side chains has been washed with water to remove the complex, the active side chains are subjected to an aliphatic or an aromatic amine to form the anion exchange resin. Amination with an amine selected from the group consisting of primary amines and secondary amines produces a weakly basic anion exchange resin or acid adsorbent, whereas a tertiary amine provides a quaternary ammonium or strongly basic anion exchange resin. Any amine containing alkyl groups, aryl groups, cycloalkyl groups and aralkyl groups may be employed. Also amines containing alcohol substituent groups are satisfactory. Most efficient quaternary ammonium anion exchange resins are generally provided by tertiary amines that have simple substituent groups with small spatial requirements.

Suitable primary and secondary amines include monomethylamine, dimethylamine, or polyethyleneamines such as diethylenetriamine, triethylenetetramine, and tetraethylenepentamine. Tertiary amines that may be used include trimethylamine, triethylamine, tripropylamine, dimethylethylamine, dimethylethanolamine, methyldiethanolamine, diethylethanolamine, n-butyldiethanolamine, benzyldimethylamine and pyridine. The preferred tertiary amines for use in this invention are dimethylethanolamine because of its high reactivity and the ease of regeneration of the resulting quaternary ammonium groups, and trimethylamine because of the thermal and chemical stability of the resulting quaternary ammonium groups. Another highly useful aminating agent is pyridine or its analogues, since an amine of this character provides a quaternary ammonium anion exchange resin that has a high degree of thermal stability although the capacity of such a resin is slightly lower than that obtained with trimethylamine.

Amination of the activated resin matrix with an aliphatic tertiary amine to produce an anion exchanger having quaternary ammonium groups results in a considerable swelling of the resin particles, especially after immersion in an aqueous medium. This swelling frequently results in some breakage of the particles. We have made the surprising discovery that this swelling can be minimized and the breakage virtually eliminated by treatment of the washed, cross-linked, activated resin with a small quantity of an aromatic base, applied either prior to or simultaneously with the aminating agent. The resulting strong base ion exchange resin is physically stronger than when the supplementary aromatic base is not employed. Any basic aromatic compound may be employed. Examples of such compounds are pyridine, picoline, lutidine, aniline, and dimethylaniline. Very small amounts of these bases may be sufficient, and as little as 0.1 mole of pyridine per aromatic nucleus in the polymer produces excellent results.

Amination of the cross-linked resin matrix having active side chains introduced by the method of this invention is best carried out as described in the aforementioned Patent No. 2,591,573 by first swelling the polymer in a suitable liquid, since swollen beads are easier to aminate. Aromatic hydrocarbons such as benzene have been found suitable for this purpose. Next the liquid is removed by decantation, and the swelled copolymer beads are aminated by contact with an amine of the class described. Vigorous agitation is desirable in order to speed the amination reaction.

Following the amination, the resultant anion exchange resinous beads are filtered from the amine liquid, and the solvent is replaced with water. This may be done in a well known manner by washing the beads in fresh organic solvent, such as benzene, next washing with an organic solvent that is miscible with water, such as an alcohol, and finally washing the beads with water.

The aminated resin may then be used as an anion exchanger by converting the resin to any desired anionic state. A strongly basic anion exchange resin can be prepared from the quaternary ammonium salt by contact with a solution of an alkali metal hydroxide, such as sodium hydroxide.

Following its use as an anion exchange resin for removing either acids or anions from liquids, the anion exchange resin can be regenerated for repeated use by subjecting the resin to an alkali metal hydroxide.

Cross-linking a linear aromatic polymer by the method of this invention provides an infusible and insoluble ion exchange resin matrix without the necessity of employing divinylbenzene. Beads of aromatic polymer may be formed by suspension polymerization of the monovinyl monomer in the conventional manner, and the resultant beads of the linear aromatic polymer cross-linked by the complex hereof to provide insoluble and infusible ion exchange resin matrix beads having active side chains to which functional anion exchange groups are attached.

Furthermore, by the use of the method of this invention, the linear aromatic polymer can be readily shaped by molding the linear polymer under heat and pressure, or dissolving the polymer in a solvent and casting it into the desired matrix form for use in preparing homogeneous ion exchange membranes. Perhaps the easiest way of forming a thin matrix film for preparing an ion exchange membrane by the method of this invention is to dissolve the linear aromatic polymer in a solvent, such as methylene chloride, and cast the polymer as a film by pouring the solution on a flat surface or on a surface of the desired membrane shape. The film of resin matrix is then cross-linked, together with introduction of active side chains, by the complex hereof to render the membrane insoluble and infusible, and functional anion exchange groups are attached by the methods herein described. The resultant homogeneous anion exchange resin membrane has a structure substantially free from cracks, whereas films of aromatic polymers that are cross-linked in a conventional manner with a polyvinyl compound tend to form cracks when the functional anion exchange groups are attached. An alternate method of forming a matrix for an anion exchange resin comprises adding the complex to a solution of the linear aromatic polymer, and casting the liquid mixture on a suitable surface on which a solid homogeneous film of cross-linked polymer is formed.

The following are typical examples of the preparation of anion exchange resins in accordance with this invention.

EXAMPLE 1

Preparation of a linear aromatic polymer

A solution containing 1600 ml. of 0.25% by weight polyvinyl alcohol suspending agent in water was placed in a 3 liter round bottom 3-neck flask fitted with a thermometer, stirrer and gas inlet tube. The solution of polyvinyl alcohol was then heated to 90° C. by means of a Glas-Col heating mantle supporting the 3-neck flask. While the polyvinyl alcohol was maintained at a temperature of 90° C., nitrogen gas was bubbled into the solution of polyvinyl alcohol for about 15 minutes, after which 400 ml. of styrene monomer containing 3.6 grams of benzoyl peroxide in solution was added with constant stirring. The temperature of the mixture was maintained at about 90° C. for 16 hours with continuous stirring and addition of nitrogen gas. The contents of the flask were then cooled, and the resultant linear polystyrene beads were washed with water until they were free of polyvinyl alcohol. Excess water was removed from the beads by suction filtration, and the beads were finally dried to constant weight by leaving them in a circulating air oven for twenty-four hours at 65° C.

Preparation of the complex

A complex was prepared by placing 12 moles (384 grams) of methanol as the polar solvent, and 12 moles (396 grams) of 91% by weight paraformaldehyde in a 4-liter glass reaction kettle having a separate 4-hole top fitted with a thermometer and stirrer. Twelve moles (1398 grams) of chlorosulfonic acid was added dropwise to the mixture of methanol and paraformaldehyde accompanied by rapid stirring. The chlorosulfonic acid was added slowly over a period of 4½ hours, and the temperature was maintained below 30° C. by immersing the reaction kettle in a cold water bath. About 15 minutes after all of the chlorosulfonic acid had been added, the complex separated into two phases in which the upper phase was a clear, light colored liquid, and the lower phase was a more viscous yellow liquid. The lower phase comprised about 7 parts by volume of the complex, and the upper phase was about 1 part by volume of the complex.

Cross-linking the aromatic polymer and formation of side chains

Three moles (312 grams) of polystyrene beads were wetted and stirred by hand with 3 ml. of oleum (104.5% $H_2SO_4$), and the polystyrene beads were then added to the complex in the kettle accompanied by rapid stirring. The reaction between the polystyrene beads and the complex was allowed to proceed at 25° C. to 30° C., with occasional cooling by a cold water bath. After a period of 8 hours, the excess liquid was drained off and kept as "spent complex" for use in Example 2, and a mixture of crushed ice and water was added to the beads in the kettle so that the maximum temperature reached was 38° C. The beads were then washed thoroughly with water and dried in a warm air cabinet at 40° C. for 16 hours. A yield of 735 grams of cross-linked product was obtained.

Preparation of an anion exchange resin 250 grams of the cross-linked polystyrene was then placed in a 2 liter round bottom flask fitted with a stirrer and thermometer, and 500 ml. of methylene chloride was added to the flask. The resultant polystyrene swelled thoroughly in a period of about one hour. Then 127 ml. of pyridine was added to the swollen beads, and about one-half hour was allowed for thorough penetration of the pyridine. Next, 250 ml. of dimethylethanolamine was incorporated in the mixture. The initial exothermic reaction caused the temperature to rise to 40° C., whereupon the mixture was cooled to room temperature by placing the flask in a cold water bath. The mixture was maintained at room temperature for 20 hours with constant stirring. Then the aminated beads were drained, washed thoroughly with water and converted into the hydroxyl form by washing with an excess of a four percent by weight aqueous solution of sodium hydroxide.

The strong base anion exchange or salt-splitting capacity of the resultant quaternary ammonium anion exchange resin was determined by flowing an excess of a solution of sodium chloride through a one inch diameter column of the beads, and titrating the amount of hydroxyl ion liberated. The capacity was found to be 1.0 meq. per ml. The anion exchange beads prepared in this manner were white, opaque, uncracked, perfectly spherical, and substantially insoluble in water, acetone, benzene, toluene, carbon tetrachloride, dioxane and methylene chloride.

EXAMPLE 2

The aromatic vinyl polymer

Two-tenths of a mole (20.8 grams) of the linear polystyrene beads prepared in accordance with the procedure specified in Example 1 were employed in this example.

Use of spent complex

In a 500 ml. round bottom flask fitted with a stirrer, thermometer and condenser, 24 grams (0.8 mole) of paraformaldehyde, 25.6 grams (0.8 mole) of methanol, and 53 ml. (0.8 mole) of chlorosulfonic acid were added to 275 ml. of the spent complex from Example 1. A slight exotherm was observed on the addition of the methanol, and the acid had to be added slowly over a period of one-half hour. The flask was cooled with a water bath in order to maintain the temperature below 30° C. There was obtained 375 ml. of a dark brown viscous liquid present in a single phase.

A one-quarter portion of this liquid (93.8 ml.) was mixed with 20.8 grams (0.2 mole) of the polystyrene beads, and the mixture was agitated. After five minutes, 12 ml. of methylene chloride was added, and after three hours with continuous agitation an additional 4 ml. of methylene chloride was added. The total reaction time was 8 hours during which time the temperature was held between 20° C. and 30° C. The excess liquid was drained off and the product thoroughly washed with cold water, and then dried in a warm forced air cabinet at 40° C. for 24 hours. The washed and dried product weighed 59.6 grams, representing a weight gain of 187%.

*Preparation of an anion exchange resin*

The beads were aminated by the procedure described in Example 1 using one-tenth of the quantities specified therein. The final product was spherical, yellow-white in color, it had a capacity to split salt of 1.1 meq. per ml., and it was insoluble in organic and inorganic liquids.

EXAMPLE 3

*Preparation of a film of linear aromatic polymer*

Commercial linear polystyrene beads sold by Koppers Company, Inc., under the name Koppers KTPL-6 were employed in this example. This linear polystyrene has a monomer content of about 1.4%, a specific gravity of 1.052, and the viscosity of a 30% by weight solution of the polystyrene in toluene at 25° C. is 242 centipoises. Ten grams of the polystyrene beads was dissolved in 100 grams of methylene chloride. This solution was poured on a flat glass plate, care being taken to avoid air bubbles in the poured film. The solvent was allowed to evaporate, and the dry film, about 0.017 in. thick, was cut up into squares about 2 inches on a side.

*Reaction of the polymer with the complex*

The impregnated squares were reacted with a complex prepared by the procedure specified in Example 1, which contained chlorosulfonic acid, paraformaldehyde, and methanol. The reaction was continued in a flat glass dish for eight hours at room temperature, with constant stirring by a magnetic stirrer. The complex was drained off, following which the insolubilized squares of film were washed free of reagents with water, dilute sodium bicarbonate solution, and again with water. The excess water was then drained off.

*Formation of an anion exchange membrane*

The film squares were next aminated by treatment with a mixture of 10 ml. methylene chloride, 3 ml. pyridine, and 25 ml. of dimethylethanolamine. Amination was continued for a period of twenty-four hours at room temperature with constant stirring. The excess solution was then drained off, and the squares were washed free of reagent with warm water.

Upon examination, the squares were found to be continuous membranes, free of cracks and fairly flexible. The membranes had an anion exchange capacity of 0.019 meq. per square centimeter, and 2.0 meq. per gram of actual dry resin.

EXAMPLE 4

*The linear aromatic polymer*

A commercial bead form of linear polystyrene sold by Koppers Company, Inc., under the name Koppers KTPL-5 was employed in this example. This linear polystyrene has a monomer content of about 1.2%, a specific gravity of 1.054, and the viscosity of a 30% by weight solution of the polystyrene in toluene at 25° C. is 117 centipoises.

*Preparation of the complex*

One mole (33 grams) of paraformaldehyde (91%) and one mole (74 grams) of n-butanol were mixed in a 500 ml. round bottom flask with stirring. One mole (116.5 grams) of chlorosulfonic acid was added drop-wise over a five hour period, the temperature being kept below 28° C. by cooling in a cold water bath.

*Cross-linking of the aromatic polymer*

One-quarter mole (26 grams) of the polystyrene beads was then added to the contents of the flask, and the reaction was allowed to proceed at room temperature for ten hours with continuous agitation. The beads were drained free of excess liquid, carefully and thoroughly washed with cold water, and then dried in an oven at 50° C. for twelve hours. The yield of beads was 54 grams.

*Preparation of anion exchange resin*

Twenty grams of these beads were swelled in 50 ml. of benzene, and then 50 ml. of tetraethylene pentamine was added as the aminating agent. The mixture was refluxed for four hours following which the benzene was distilled off and the beads heated in the amine for an additional four hours at 140° C. The mixture was cooled, the excess liquid drained off, the beads washed first with methanol, and then with water.

After treatment with an excess of dilute sodium hydroxide solution, a test of the ion exchange properties showed the strong base capacity (or quaternary ammonium capacity) to be negligible, but the acid adsorption capacity was 2.1 meq. per ml. The capacity was measured by regenerating a column of the resin in a one inch diameter glass tube with an excess of dilute sodium hydroxide, rinsing the resin thoroughly with water, and then washing the column with a known excess of dilute hydrochloric acid. The amount of acid removed by the resin was determined by titration of the effluent.

EXAMPLE 5

A linear polystyrene polymer prepared in the manner described in Example 1 was employed in this example.

*Preparation of the complex and reaction with the polymer*

One mole (33 grams) of paraformaldehyde (91%) and one mole (116.5 grams) of chlorosulfonic acid were carefully mixed while maintaining a temperature below 30° C. by cooling with cold water. One-quarter mole (26 grams) of polystyrene beads made in accordance with the procedure above specified was added to the flask followed by drop-wise addition of one mole (58 grams) of acetone over a two hour period. The temperature was maintained below 25° C. during the addition of the acetone by use of a cold water bath. Next, fifteen ml. of ethylene dichloride was added as a swelling solvent and the reaction was allowed to proceed for eight additional hours. The beads were then drained, washed with ethanol, then water, and finally dried at 60° C. for two hours. The yield of beads was 51 grams.

*Preparation of the anion exchange resin*

Twenty grams of these beads were aminated by first swelling the beads in 50 ml. of benzene followed by the addition of 200 ml. of a 25% aqueous solution of trimethylamine, which is a tertiary amine. Rapid agitation of the mixture was continued for twenty-four hours at room temperature, after which the excess liquid was poured off. The beads were washed with ethanol to remove the benzene, and the resin was then thoroughly washed with water. After treatment with an excess of dilute sodium hydroxide solution, the salt splitting capacity of the resulant quaternary ammonium anion exchange resin was found to be 0.75 meq. per ml.

We claim:

1. The method of making an anion exchange resin which comprises reacting a solid linear polymer selected from the group consisting of a solid linear polymer of a mono vinyl aryl hydrocarbon and a linear polymer of a mono vinyl aryl nuclear chlorinated hydrocarbon, with chlorosulfonic acid and formaldehyde to cross-link the polymer, and including a primary alcohol containing from 1 to 4 carbon atoms to introduce side chains in said polymer, there being at least one mole of chlorosulfonic acid and one mole of formaldehyde for each group in said polymer, the concentration of acid being at least 70% of the weight of acid and water present, and then treating the resultant reacted polymer with an amine whereby anion exchange groups are attached to active side chains in the polymer.

2. The method of claim 1 in which the primary alcohol is methanol.

3. The method of claim 1 in which the formaldehyde is obtained from paraformaldehyde.

4. The method of claim 1 in which the formaldehyde is obtained from polyoxymethylene.

5. The method of claim 1 in which the anion exchange resin is a weakly basic exchange resin formed by an amine having from one to two hydrogens on the amino group nitrogen.

6. The method of claim 1 in which the anion exchange resin is a quaternary ammonium strongly basic anion exchange resin formed by reacting the resin matrix with a tertiary amine.

7. The method of claim 6 in which the amine is a tertiary amine, and the reacted polymer is treated with an aromatic amine prior to treatment with said tertiary amine to obviate swelling and breakage that may otherwise occur when said reacted polymer is treated with said amine.

8. The method of claim 6 in which the amine is a tertiary amine, and the reacted polymer is treated with pyridine prior to treatment with said tertiary amine to obviate swelling and breakage that may otherwise occur when said reacted polymer is treated with said amine.

9. The method of claim 1 in which the linear polymer is wetted with concentrated sulfuric acid prior to reaction with said chlorosulfonic acid, formaldehyde and primary alcohol to prevent partial solution of said polymer.

10. The method of claim 1 in which the amine is dimethylethanolamine.

11. The method of claim 1 in which the amine is pyridine.

12. The method of claim 1 in which the amine is trimethylamine.

13. The method of claim 1 wherein the linear polymer is in the shape of a film of polymer, whereby a homogeneous anion exchange membrane is formed.

14. A homogeneous anion exchange resin membrane prepared by the method of claim 13.

15. The method of claim 1 wherein the linear polymer is in the form of beads of said polymer.

16. The anion exchange resin resulting from the method of claim 1.

17. The method of removing anions from liquid media which comprises subjecting said liquid media to contact with the anion exchange resin of claim 16.

18. The method of claim 1 in which said linear polymer is reacted with at least two moles of formaldehyde, at least two moles of chlorosulfonic acid, and at least two moles of said primary alcohol for each aryl group present in said polymer.

References Cited in the file of this patent

UNITED STATES PATENTS

| | | |
|---|---|---|
| 2,332,896 | D'Alelio | Oct. 26, 1943 |
| 2,366,008 | D'Alelio | Dec. 26, 1944 |
| 2,591,573 | McBurney | Apr. 1, 1952 |
| 2,629,710 | McBurney | Feb. 24, 1953 |

UNITED STATES PATENT OFFICE
CERTIFICATE OF CORRECTION

August 18, 1959

Patent No. 2,900,352

James A. Patterson et al.

It is hereby certified that error appears in the printed specification of the above numbered patent requiring correction and that the said Letters Patent should read as corrected below.

Column 13, line 1, before "group" insert -- aryl --.

Signed and sealed this 16th day of February 1960.

(SEAL)
Attest:

KARL H. AXLINE
Attesting Officer

ROBERT C. WATSON
Commissioner of Patents